(No Model.) 2 Sheets—Sheet 1.

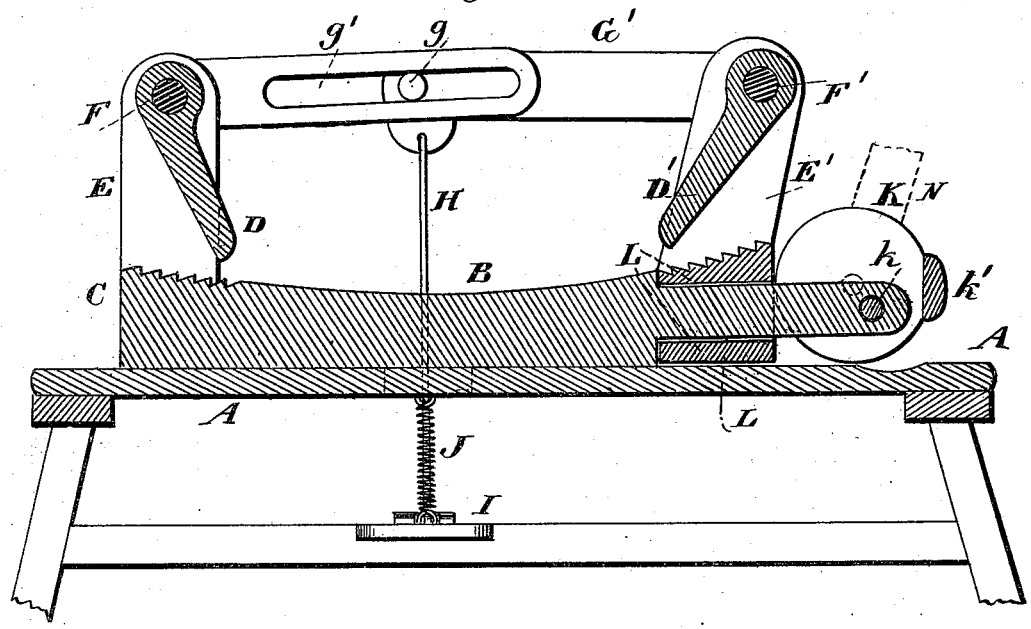

P. BARNES.
TIRE SHRINKER OR UPSETTER.

No. 466,392. Patented Jan. 5, 1892.

Witnesses.
A. Ruppert.
G. B. Towles

Inventor.
Patrick Barnes,
Per
Thomas P. Simpson
Atty.

UNITED STATES PATENT OFFICE.

PATRICK BARNES, OF POWNAL, VERMONT.

TIRE SHRINKER OR UPSETTER.

SPECIFICATION forming part of Letters Patent No. 466,392, dated January 5, 1892.

Application filed March 12, 1891. Serial No. 384,787. (No model.)

*To all whom it may concern:*

Be it known that I, PATRICK BARNES, a citizen of the United States, residing at Pownal, in the county of Bennington and State of Vermont, have invented certain new and useful Improvements in Tire Shrinkers or Upsetters; and I do hereby declare the following to be a full, clear, and exact description of the invention, such as will enable others skilled in the art to which it appertains to make and use the same.

The special object of the invention is to make a tire upsetter or shrinker which may be conveniently adjusted to hold tires of greater or less size and which may be provided with a mechanism to be operated by a treadle for clamping the tire.

Figure 1:
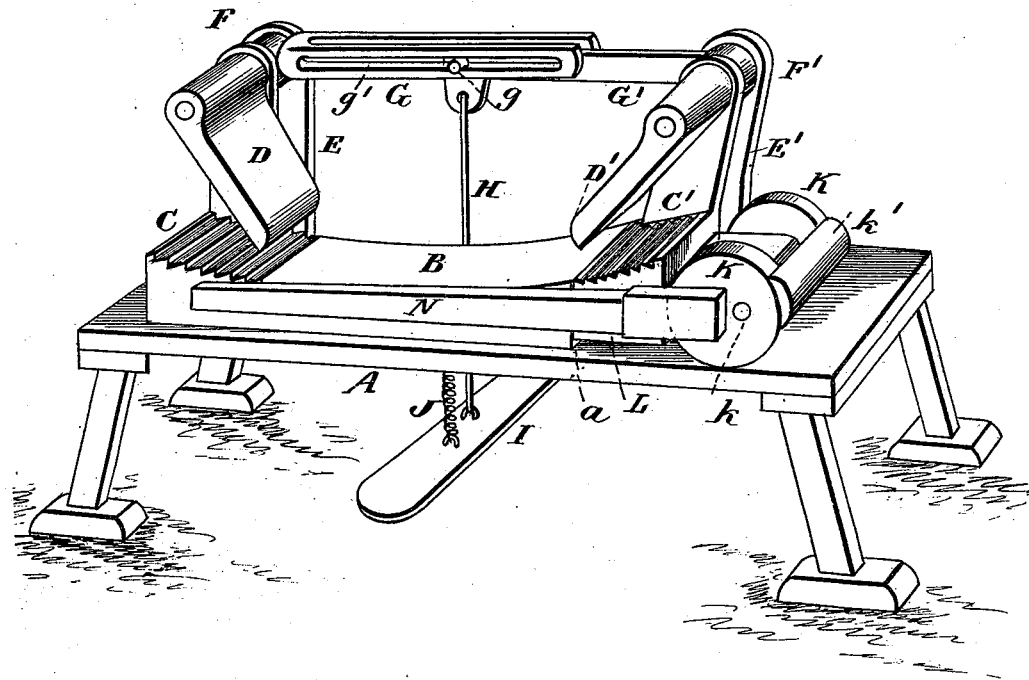
Figure 3:
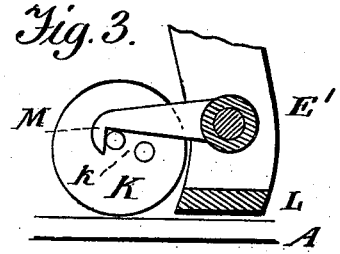

Figure 1 of the drawings is a perspective view of my tire shrinker or upsetter, and Fig. 2 a longitudinal vertical section. Fig. 3 is a detail sectional view showing the connection between the bed and eccentrics.

In the drawings, A represents the base of the upsetter; B, the tire-bed, which is concaved on a curve upon the upper face, and C C' the serrated surfaces on which the tire is clamped by the dogs D D'.

E E' are parallel uprights connected by a spacer at or near the bottom and at the top by the shafts F F'. Fixed on these shafts are the dogs D D' and the arms G G', one of the latter being bifurcated and slotted, while the other is provided with side studs to work in the slots. By reason of the studs or slots $g'$ $g$ the pivoted rod H and end-hinged treadle I may pull down the arms G G' until the dogs hold the tire fast on the serrated surfaces C C'. The rod H passes through a hole in the base A and is jointed to the treadle and arm G', the treadle and arms G G' being retracted or raised up by a spiral spring J.

In order to make the tire shrinker or upsetter adjustable to tires of greater or less circumference, I secure fast to each other the parts C' D' E' F' G' and make them movable together on the bed A up to and from the shoulder $a$. To accomplish this I use the two disks K K, pivoted eccentrically to the end of the base and bearing against the said movable parts of slide L, which is connected with the projecting end of the shaft $k$ by a pivoted hook M. By this means tires of varying size may be upset with ease and convenience. The disks K have each a stop $k'$ on it, and are operated by a hand-lever N on one of them. The stop $k'$ limits the backward rotation of the eccentrics K, while the thrust of the slide L is taken always by the said eccentrics, whose shaft $k$ rotates in one end of the fixed bed B. The latch M serves to retract the slide L, while the eccentrics push it inwardly.

Having thus described all that is necessary to a full understanding of my invention, what I claim as new, and desire to protect by Letters Patent, is—

1. In a tire shrinker or upsetter, the combination, with the pivoted dogs D D', tire-bed B, and serrated surfaces C C', of the arms G G', one of which is bifurcated and slotted, while the other is provided with side studs to work in said slots, the said arms being fixed on the same shaft as the said dogs and being connected by a pivoted rod with a treadle, all substantially as shown, and for the purpose set forth.

2. In a tire shrinker or upsetter, the parts C' D' E' F' G', connected together to form the slide L and provided with the hook M, in combination with the disks K K, eccentrically pivoted to the end of the bed B and connected by said hook and a projecting end of shaft $k$, whereby a hand-lever may be used to operate the slide L, as and for the purpose set forth.

In testimony whereof I affix my signature in presence of two witnesses.

PATRICK BARNES.

Witnesses:
  A. T. CARD,
  A. S. LADD.